United States Patent
Szmuszkovicz

[11] 3,882,112
[45] May 6, 1975

[54] 7-PHENYL-3-[2-(DIALKYLAMINO)-ALKYL]-3,4-DIHYDROAS-TRIAZINO[4,3-A][1,4]BENZODIAZEPIN-2(1H)-ONES

[75] Inventor: Jacob Szmuszkovicz, Kalamazoo, Mich.

[73] Assignee: The Upjohn Company, Kalamazoo, Mich.

[22] Filed: Sept. 19, 1973

[21] Appl. No.: 398,641

[52] U.S. Cl......... 260/248 AS; 424/249; 260/247.1; 260/247.2 A
[51] Int. Cl............................................ C07d 57/34
[58] Field of Search..... 260/248 AS, 247.1, 247.2 A

[56] References Cited
UNITED STATES PATENTS
3,818,003  6/1974  Szmuszkovicz.................. 260/248

Primary Examiner—John M. Ford
Attorney, Agent, or Firm—Hans L. Berneis

[57] ABSTRACT
Compounds of the formula:

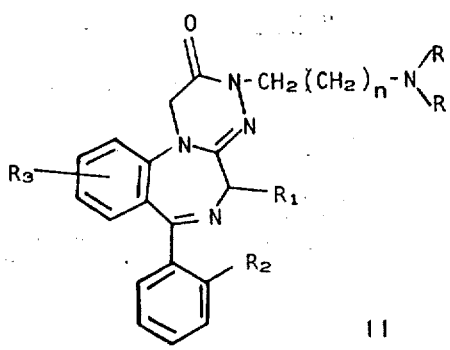

wherein n is 1 or 2; wherein R is hydrogen, alkyl of one to three carbon atoms, inclusive, or together

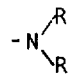

is pyrrolidino, piperidino, methylpiperazino, or morpholino; wherein $R_1$ is hydrogen or alkyl as defined above; and wherein $R_2$ and $R_3$ are hydrogen, alkyl as defined above, fluorine, chlorine, bromine, nitro, trifluoromethyl, or alkylthio in which alkyl is defined as above, are prepared by reacting a compound of the formula:

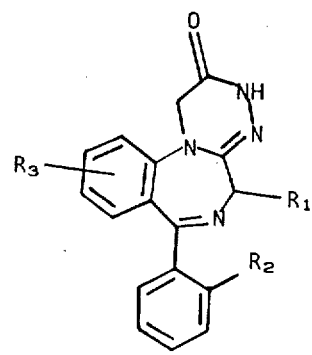

wherein $R_1$, $R_2$, and $R_3$ are defined as above, with sodium hydride and then with

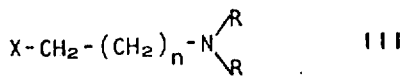

III wherein X is chlorine, bromine, or iodine, and n, R or

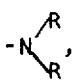

are defined as above to obtain the compound of the formula above.

The compounds of the formula 11 above and the pharmacologically acceptable acid addition salt thereof have sedative and tranquilizing activity.

9 Claims, No Drawings

7-PHENYL-3-[2-(DIALKYLAMINO)-ALKYL]-3,4-DIHYDROAS-TRIAZINO[4,3-A][1,4]BENZODIAZEPIN-2(H)-ONES

BACKGROUND OF THE INVENTION

1. Field of the Invention

This invention is directed to new organic compounds and is more particularly concerned with novel 7-phenyl-3-(substituted)-3,5-dihydro-as-triazino[4,3-a][1,4]benzodiazepin-2-(1H)-ones and a process of production therefor.

The novel compounds II and the process of production therefor can be illustratively represented as follows:

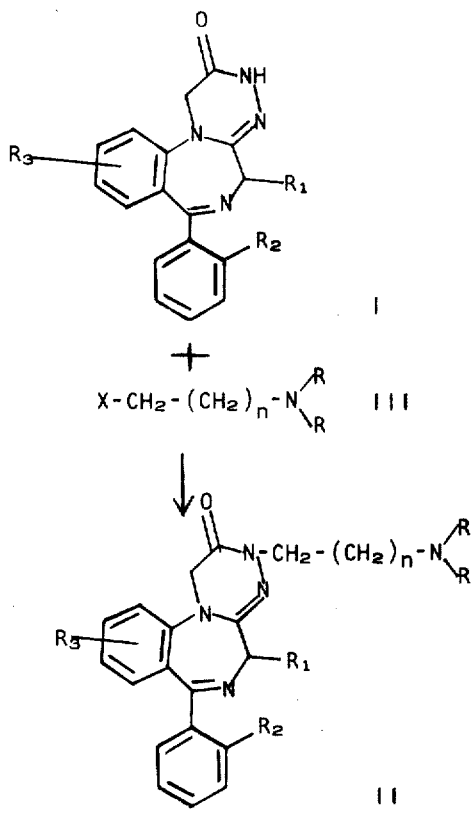

wherein n is 1 or 2; wherein R is hydrogen, alkyl of one to three carbon atoms, inclusive, or together $$-N\begin{matrix}R\\R\end{matrix}$$

is pyrrolidino, piperidino, methylpiperazino, or morpholino; wherein $R_1$ is hydrogen or alkyl as defined above; wherein $R_2$ and $R_3$ are hydrogen, alkyl as defined above, fluorine, chlorine, bromine, nitro, trifluoromethyl, or alkylthio in which alkyl is defined as above, and wherein X is chlorine, bromine, or iodine.

The invention also comprises the pharmacologically acceptable acid addition salt of the compounds of formula II.

The more desirable products of this invention have the formula IIA:

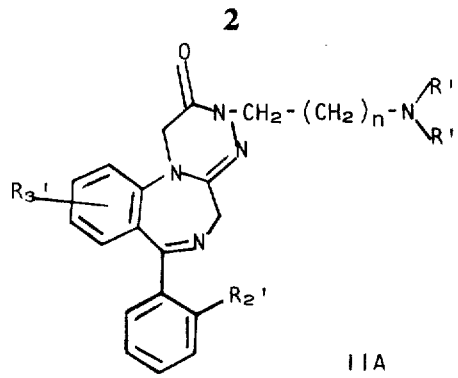

wherein n is 1 or 2; wherein R' is hydrogen or alkyl of one to three carbon atoms, inclusive, and wherein $R_2'$ and $R_3$ are hydrogen, chlorine, or fluorine; and the pharmacologically acceptable acid addition salts thereof.

The most desirable products of this invention have the formula IIB:

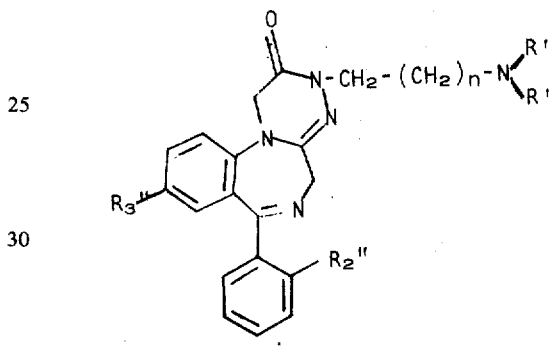

wherein n is 1 or 2; wherein R' is hydrogen or alkyl of one to three carbon atoms, inclusive, and wherein $R_2''$ and $R_3''$ are hydrogen or chlorine, and the pharmacologically acceptable acid addition salts thereof.

The process of this invention comprises: treating a compound of formula I with a strong base, e.g., sodium or potassium hydride or sodium or potassium methoxide or ethoxide between 20°–100° and thereafer with a halide of the formula III:

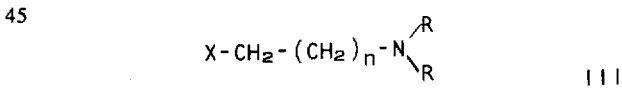

wherein n and R are defined above, and X is chlorine, bromine, or iodine at a temperature of 20° to 100° C. to give the compound II.

Compound II by reaction with a selected pharmacologically acceptable salt, in stoichiometrically quantity, provides the acid addition salts of compound II.

DESCRIPTION OF THE PREFERRED EMBODIMENT

Lower alkyl groups of one to three carbon atoms, inclusive, are exemplified by methyl, ethyl, propyl, and isopropyl.

The novel compounds of the formula II (and also IIA and IIB), including acid addition salts thereof have sedative, tranquilizing and muscle relaxant effects in mammals and birds.

The acid addition salts of compounds of formula II contemplated in this invention, are the hydrochlorides, hydrobromides, hydriodides, sulfates, phosphates, cyclohexane-sulfamates, methanesulfonates and the like, prepared by reacting a compound of formula I with the stoichiometrically calculated amount of the selected pharmacologically acceptable acid.

Sedative effects of these compounds of formula II (IIA and IIB included), were measured by standard procedures used in the art, and as shown below:

Chimney test: [Med. Exp. 4, 145 (1961)]: The test determines the ability of mice to back up and out of a vertical glass cylinder within 30 seconds. At the effective dosage ($ED_{50}$), 50% of the mice are unable to pass this test.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.

Pedestal test: The untreated mouse leaves the pedestal in less than a minute to climb back to the floor of the standard mouse box. Tranquilized mice will stay on the pedestal for more than 1 minute.

Nicotine antagonism test: Mice in a group of 6 are injected with the test compound. Thirty minutes later the mice, including control (untreated) mice, are injected with nicotine salicylate (2 mg./kg.). The control mice show overstimulation, i.e., (1) running convulsions followed by (2) tonic extensor fits; followed by (3) death.

These compounds also had minor anti-depressant activity at 2–15 mg./kg. which makes them useful for the treatment of anxieties.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies and the like. Suitable diluents or carriers such as carbohydrates (lactose), proteins, lipids, calcium phosphate, cornstarch, stearic acid, methylcellulose and the like may be used as carriers or for coating purposes. Water and oils, e.g., coconut oil, sesame oil, safflower oil, cottonseed oil, peanut oil, and water may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared.

As tranquilizer and anti-anxiety agents, the compounds of formulae II (including IIA and IIB) or the pharmacologically acceptable acid addition salts thereof can be used in dosages of 0.25 mg. to 20.0 mg./kg., preferably 0.5 to 10 mg./kg. in oral or injectable preparations as described above, to alleviate tension and anxiety in mammals, or birds, such as, e.g., occurs when animals are in travel. For larger animals, in excess of 5 kg. the lower-dosage ranges are indicated.

Other acid addition salts of the compounds of formulae II can be made such as the fluosilicic acid addition salts which are useful mothproofing compounds or the trichloroacetates useful as herbicides against Johnson grass, Bermuda grass, yellow foxtail, and green foxtail, and quack grass.

The starting materials of formula I of this invention, can be produced by methods generically disclosed in the Preparations.

In carrying out the novel process of this invention a selected 7-phenyl-3,5-dihydro-as-triazino[4,3-a][1,4]benzodiazepin-2(1H)-one I is first treated with a strong base in an inert organic solvent between 25°–100° for 0.5 to 24 hrs. As solvents dimethylformamide, dimethylacetamide, tetrahydrofuran, dimethylsulfoxide, 1,2-dimethoxyethane, mixtures thereof the like can be used. As strong base, sodium, potassium or lithium hydride or sodium or potassium alkoxides, e.g., sodium ethoxide, potassium methoxide are employed, with sodium hydride preferred.

The thus-produced metal-organic compound is then reacted with a selected halide of formula III in the same solvent mixture, preferably containing xylene. The temperature for this reaction is 25° to 100° C. with the higher temperatures 85°–100° C. preferred. The time to complete this reaction is from 0.5–48 hours. Thereafter, the product II is isolated and purified by conventional procedures, e.g., extraction, crystallization, chromatography and the like.

Pharmacologically acceptable acid addition salts of compounds II are generally made by admixing the compound of the formula with the selected acid in the exact stoichiometric proportion and recovering the salt by evaporating any solvent present, e.g., ether, tetrahydrofuran, and the like.

The following Preparations and Examples are illustrative of the products and processes of the present invention but are not to be construed as limiting.

PREPARATION 1

7-Chloro-2,3-dihydro-2-oxo-5-phenyl-1H-1,4-benzodiazepine-1-acetic acid methyl ester Sodium methoxide (5.95 g., 0.11 mole) is added to a solution of 7-chloro-1,3-dihydro-5-phenyl-2H-1,4-benzodiazepin-2-one (27 g., 0.1 mole) in 200 ml. of dimethylformamide and the mixture is stirred and heated on a steam bath for about 20minutes. To this mixture is added a solution of methyl bromoacetate (16.7 g., 0.11 mole) in 165 ml. of toluene during 1 hour while stirring and heating are continued. The mixture is heated for an additional 2 hours, allowed to stand overnight at room temperature (about 25° C.) and evaporated to dryness in vacuo. The residue is stirred with 500 ml. of water until a suspension results. The suspension is filtered and the solid thus obtained is crystallized first from ether and then from methanol to give 14.5 g. (42% yield) of 7-chloro-2,3-dihydro-2-oxo-5-phenyl-1H-1,4-benzodiazepine-1-acetic acid methyl ester of melting point 137–138° C.

PREPARATION 2

7-Chloro-5-(o-chlorophenyl)-2,3-dihydro-2-oxo-1H-1,4-benzodiazepine-1-acetic acid methyl ester Sodium methoxide (5.95 g., 0.11 mole) is added to a solution of 7-chloro-1,3-dihydro-5-(o-chlorophenyl)-2H-1,4-benzodiazepin-2-one (30.5 g., 0.1 mole) in 200 ml. of dimethylformamide and the mixture is heated at 95° for about 15 minutes. To the mixture is added a solution of methyl bromoacetate (16.7 g., 0.11 mole) in 165 ml. of toluene during 55 minutes while heating is continued. After heating the mixture for an additional 6.25 hours, it is evaporated to dryness, and the residue is stirred with 400 ml. of water and 200 ml. of ether.

The resulting suspension is filtered and the solid thus obtained is crystallized from methylene chloride-methanol to give 24.9 g. of 7-chloro-5-(o-chlorophenyl)-2,3-dihydro-2-oxo-1H-1,4-benzodiazepine-1-acetic acid methyl ester of melting point 193°–194° C.

Anal. calcd. for $C_{18}H_{14}Cl_2N_2O_3$:
C, 57.31; H, 3.74; Cl, 18.80; N, 7.43.
Found: C, 57.38; H, 4.03; Cl, 18.92; N, 7.55.

PREPARATION 3

5-(o-chlorophenyl)-2,3-dihydro-2-oxo-1H-1,4-benzodiazepine-1-acetic acid methyl ester Sodium methoxide (2.26 g.; 0.042 mole) is added to a solution of 5-(o-chlorophenyl)-1,3-dihydro-2H-1,4-benzodiazepin-2-one (10.3 g., 0.038 mole) in 100 ml. of dimethylformamide and the mixture is heated at 95° for about 25 minutes. To the mixture is added a solution of methyl bromoacetate (6.4 g., 0.042 mole) in 65 ml. of toluene during 45 minutes while heating is continued. The mixture is heated for an additional 5.5 hours and allowed to stand overnight. It is evaporated to dryness and the residue is stirred with a mixture of 150 ml. of water and 150 ml. of ether. The resulting suspension is filtered, and the solid thus obtained is crystallized from methanol to give 7.9 g. of 5-(o-chlorophenyl)-2,3-dihydro-2-oxo-1H-1,4-benzodiazepine-1-acetic acid methyl ester of melting point 166°–167.5° C.

Anal. calcd. for $C_{18}H_{15}ClN_2O_3$:
C, 63.07; H, 4.41; Cl, 10.34; N, 8.17.
Found: C, 62.87; H, 4.44; Cl, 10.38; N, 8.17.

PREPARATION 4

7-Chloro-2,3-dihydro-2-oxo-5-(2,6-difluorophenyl)-1H-1,4-benzodiazepine-1-acetic acid methyl ester A mixture of 0.1 mole of 7-chloro-1,3-dihydro-5-(2,6-difluorophenyl)-2H-1,4-benzodiazepin-2-one and 0.11 mole of sodium methoxide in about 200 ml. of tetrahydrofuran is heated at about 95° C. for about 20 minutes. To the mixture is added a solution of 0.11 mole of methyl bromoacetate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-chloro-2,3-dihydro-2-oxo-5-(2,6-difluorophenyl)-1H-1,4-benzodiazepine-1-acetic acid methyl ester.

PREPARATION 5

7-Trifluoromethyl-2,3-dihydro-2-oxo-5-phenyl-1H-1,4-benzodiazepine-1-acetic acid ethyl ester A mixture of 0.1 mole of 7-trifluoromethyl-1,3-dihydro-5-phenyl-2H-1,4-benzodiazepin-2-one and 0.11 mole of sodium methoxide in about 200 ml. of tetrahydrofuran is heated at about 95° C. for about 20 minutes. To the mixture is added a solution of 0.11 mole of ethyl bromoacetate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-fluoro-2,3-dihydro-α,α-dimethyl-2-oxo-5-phenyl-1H-1,4-benzodiazepine-1-acetic acid methyl ester.

PREPARATION 6

7-nitro-2,3-dihydro-2-oxo-5-(o-chlorophenyl)-1H-1,4-benzodiazepine-1-acetic acid propyl ester A mixture of 0.1 mole of 7-nitro-1,3-dihydro-5-(o-chlorophenyl)-2H-1,4-benzodiazepin-2-one and 0.11 mole of sodium methoxide in about 200 ml. of tetrahydrofuran is heated at about 95° C. for about 20 minutes. To the mixture is added a solution of 0.11 mole of propyl 2-bromoacetate in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-nitro-2,3-dihydro-2-oxo-5-(o-chlorophenyl)-1H-1,4-benzodiazepine-1-acetic acid propyl ester.

PREPARATION 7

9-bromo-2,3-dihydro-2-oxo-5-(m-nitrophenyl)-1H-1,4-benzodiazepine-1-acetic acid methyl ester A mixture of 0.1 mole of 9-bromo-1,3-dihydro-5-(m-nitrophenyl)-2H-1,4-benzodiazepin-2-one and 0.11 mole of sodium methoxide in about 200 ml. of tetrahydrofuran is heated at about 95° C. for about 20 minutes. To the mixture is added a solution of 0.11 mole of methyl 2-bromoacetate in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 9-bromo-2,3-dihydro-2-oxo-5-(m-nitrophenyl)-1H-1,4-benzodiazepine1 1-acetic acid methyl ester.

PREPARATION 8

7-Methylthio-5-(o-chlorophenyl)-2,3-dihydro-2-oxo-1H-1,4-benzodiazepine-1-acetic acid methyl ether A mixture of 0.1 mole of 7-methylthio-1,3-dihydro-5-(o-chlorophenyl)-2H-1,4-benzodiazepin-2-one and 0.11 mole of sodium methoxide in about 200 ml. of tetrahydrofuran is heated at about 95° C. for about 20 minutes. To the mixture is added a solution of 0.11 mole of methyl 2-bromoacetate in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-methylthio-5-(o-chlorophenyl)-2,3-dihydro-2-oxo-1H-1,4-benzodiazepine-1-acetic acid methyl ester.

In the manner given in the Preparations above, other 1,3-dihydro-2H-1,4-benzodiazepin-2-ones can be reacted with the appropriate alkyl 2-haloalkanoate to provide other 2,3-dihydro-2-oxo-1H-1,4-benzodiazepine-1-acetic acid alkyl esters. For example, the following 1,3-dihydro-2H-1,4-benzodiazepin-2-ones can be obtained:

7-bromo-1,3-dihydro-5-phenyl-2H-1,4-benzodiazepin-2-one;
7-fluoro-1,3-dihydro-5-phenyl-2H-1,4-benzodiazepin-2-one;
1,3-dihydro-7-nitro-5-phenyl-2H-1,4-benzodiazepin-2-one;
1,3-dihydro-7-methylthio-5-phenyl-2H-1,4-benzodiazepin-2-one;
7-bromo-5-(o-bromophenyl)-1,3-dihydro-2H-1,4-benzodiazepin-2-one;
5-(o-fluorophenyl)-7-fluoro-1,3-dihydro-2H-1,4-benzodiazepin-2-one;
5-(o-chlorophenyl)-1,3-dihydro-7-propylthio-3-methyl-2H-1,4-benzodiazepin-2-one;
5-(o-chlorophenyl)-1,3-dihydro-7-(trifluoromethyl)-2H-1,4-benzodiazepin-2-one;
5-(o-chlorophenyl)-3-ethyl-1,3-dihydro-2H-1,4-benzodiazepin-2-one;
5-(o-chlorophenyl)-1,3-dihydro-7-(ethylthio)-2H-1,4-benzodiazepin-2-one;
7-chloro-5-(o-fluorophenyl)-1,3-dihydro-2H-1,4-benzodiazepin-2-one;
7-bromo-5-(o-fluorophenyl)-1,3-dihydro-2H-1,4-benzodiazepin-2-one;
7-fluoro-5-(o-fluorophenyl)-1,3-dihydro-2H-1,4-benzodiazepin-2-one;
5-(o-fluorophenyl)-1,3-dihydro-7-nitro-2H-1,4-benzodiazepin-2-one;
5-(o-fluorophenyl)-1,3-dihydro-7-(trifluoromethyl)-2H-1,4-benzodiazepin-2-one;
7-trifluoromethyl-5-(o-fluorophenyl)-1,3-dihydro-2H-1,4-benzodiazepin-2-one;
5-(o-fluorophenyl)-1,3-dihydro-7-(methylthio)-2H-1,4-benzodiazepin-2-one; and the like.

PREPARATION 9

7-Chloro-2,3-dihydro-5-phenyl-2-thioxo-1H-1,4-benzodiazepine-1-acetic acid methyl ester A mixture of 6.35 g. (0.0186 mole) of 7-chloro-2,3-dihydro-2-oxo-5-phenyl-1H-1,4-benzodiazepine-1-acetic acid methyl ester, 4.42 g. (0.0199 mole) of phosphorus pentasulfide and 185 ml. of pyridine is heated under reflux for about 19 hours. The pyridine is evaporated, 100 ml. of cold water is added, and the product is extracted with four 100-ml. portions of methylene chloride. The extracts are combined, washed with sodium bicarbonate solution and with saturated salt solution, dried over magnesium sulfate and evaporated to give 2.5 g. of residue. The residue thus obtained is extracted with eight 250-ml. portions of boiling ether. The extracts are combined and concentrated. On standing 2.1 g. of 7-chloro-2,3-dihydro-5-phenyl-2-thioxo-1H-1,4-benzodiazepin-1-acetic acid methyl ester of melting point m.p. 180°–182° C. crystallizes from solution; recrystallization from ether raises the melting point to 185°–187° C.

PREPARATION 10

7-Chloro-2,3-dihydro-5-phenyl-2-thioxo-1H-1,4-benzodiazepin-1-acetic acid methyl ester The procedure of Preparation 10 is repeated to the point where a residue is obtained following evaporation of the methylene chloride. The residue thus obtained is chromatrographed on silica gel using 50% ethyl acetate-cyclohexane to give 7-chloro-2,3-dihydro-5-phenyl-2-thioxo-1H-1,4-benzodiazepine-1-acetic acid methyl ester of melting point 188°–189° C. (from ether).

Anal. calcd. for $C_{18}H_{16}ClN_2O_2S$:
C, 60.24; H, 4.21; Cl, 9.88; N, 7.81; S, 8.94.
Found: C, 60.14; H, 4.40; Cl, 9.81; N, 7.76; S, 9.06.

PREPARATION 11

7-Chloro-5-(o-chlorophenyl)-2,3-dihydro-2-thioxo-1H-1,4-benzodiazepine-1-acetic acid methyl ester A mixture of 3.8 g. (0.01 mole) of 7-chloro-5-(o-chlorophenyl)-2,3-dihydro-2-oxo-1H-1,4-benzodiazepine-1-acetic acid methyl ester, 2.3 g. (0.0105 mole) of phosphorus pentasulfide and 100 ml. of pyridine is heated under reflux for about 22 hours. The reaction mixture is evaporated and the residue thus obtained is dissolved in chloroform and 100 ml. of aqueous sodium bicarbonate solution. The organic layer is separated, washed with three 50-ml. portions of aqueous sodium bicarbonate solution and with saturated salt solution, dried over anhydrous magnesium sulfate and evaporated to remove the solvent. The residue (4.1 g.) thus obtained is dissolved in about 20 ml. of methylene chloride and chromatographed on 410 g. of silica gel. Elution with 50% ethyl acetate-methylene chloride gives 1.79 g. of 7-chloro-5-(o-chlorophenyl)-2,3-dihydro-2-thioxo-1H-1,4-benzodiazepine-1-acetic acid methyl ester. Recrystallization from ether gives 7-chloro-5-(o-chlorophenyl)-2,3-dihydro-2-thioxo-1H-1,4-benzodiazepine-1-acetic acid methyl ester of melting point 191°–192° C.; a sample recrystallized from methanol melts at 193°–194° C.

Anal. calcd. for $C_{18}H_{14}Cl_2N_2O_2S$:
C, 54.97; H, 3.59; Cl, 18.03; N, 7.12; S, 8.15.
Found: C, 54.82; H, 3.71; Cl, 18.15; N, 6.91; S, 8.37.

PREPARATION 12

5-(o-chlorophenyl)-2,3-dihydro-2-thioxo-1H-1,4-benzodiazepine-1-acetic acid methyl ester A mixture of 7.75 g. (0.0225 mole) of 5-(o-chlorophenyl)-2,3-dihydro-2-oxo-1H-1,4-benzodiazepine-1-acetic acid methyl ester, 5.3 g. (0.0238 mole) of phosphorus pentasulfide and 200 ml. of pyridine is heated under reflux for about 23 hours. The reaction mixture is then evaporated and the residue thus obtained is dissolved in methylene chloride-water. The organic layer is separated, washed with five 100-ml. portions of saturated aqueous sodium bicarbonate solution, dried over anhydrous magnesium sulfate and evaporated to remove the solvent. The residue (7.3 g.) thus obtained is dissolved in 50 ml. of methylene chloride and chromatographed on 730 g. of silica gel. Elution with 60% ethyl acetate-cyclohexane gives 4.8 g. of product which is triturated with methanol, filtered and washed with ether to give 3.5 g. of 5-(o-chlorophenyl)-2,3-dihydro-2-thioxo-1H-1,4-benzodiazepine-1-acetic acid methyl ester; a sample after recrystallization from methanol-chloroform melts at 183°–184° C.

Anal. calcd. for $C_{18}H_{15}ClN_2O_2S$: C, 60.24; H, 4.21; Cl, 9.88; N, 7.81; S, 8.95.
Found: C, 60.11; H, 4.20; Cl, 10.06; N, 7.39; S, 9.06.

PREPARATION 13

7-chloro-5-(2,6-difluorophenyl)-2,3-dihydro-2-oxo-1H-1,4-benzodiazepine-1-acetic acid methyl ester A mixture of 0.01 mole of 7-chloro-5-(2,6-difluorophenyl)-2,3-dihydro-2-oxo-1H-1,4-benzodiazepine-1-acetic acid methyl ester, 0.0105 mole of phosphorus pentasulfide and 100 ml. of pyridine is heated under reflux for about 24 hours. The reaction mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-chloro-5-(2,6-difluorophenyl)-2,3-dihydro-2-thioxo-1H-1,4-benzodiazepine-1-acetic acid methyl ester.

PREPARATION 14

2,3-Dihydro-5-phenyl-2-thioxo-7-(trifluoromethyl)-1H-1,4-benzodiazepine-1-acetic acid ethyl ester A mixture of 0.01 mole of 7-trifluoromethyl-2,3-dihydro-2-oxo-5-phenyl-1H-1,4-benzodiazepin-1-acetic acid ethyl ester and 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 2,3-dihydro-5-phenyl-2-thioxo-7-(trifluoromethyl)-1H-1,4-benzodiazepine-1-acetic acid ethyl ester.

PREPARATION 15

7-fluoro-α-ethyl-2,3-dihydro-2-thioxo-5-(o-chlorophenyl)-1H-1,4-benzodiazepine-1-acetic acid propyl ester.

A mixture of 0.01 mole of 7-fluoro-α-ethyl-2,3-dihydro-2-oxo-5-(o-chlorophenyl)-1H-1,4-benzodiazepine-1-acetic acid propyl ester, 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-fluoro-α-ethyl-2,3-dihydro-2-thioxo-5-(o-chlorophenyl)-1H-1,4-benzodiazepine-1-acetic acid propyl ester.

PREPARATION 16

7-nitro-2,3-dihydro-5-(o-chlorophenyl)-2-thioxo-1H-1,4-benzodiazepine-1-acetic acid methyl ester A mixture of 0.01 mole of 7-nitro-2,3-dihydro-5-(o-chlorophenyl)-1H-1,4-benzodiazepine-1-acetic acid methyl ester, 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-nitro-2,3-dihydro-5-(o-chlorophenyl)-2-thioxo-1H-1,4-benzodiazepine-1-acetic acid methyl ester.

PREPARATION 17

7-methylthio-5-(o-chlorophenyl)-2,3-dihydro-2-thioxo-1H-1,4-benzodiazepine-1-acetic acid methyl ester A mixture of 0.01 mole of 7-methylthio-5-(o-chlorophenyl)-2,3-dihydro-2-oxo-1H-1,4-benzodiazepine-1-acetic acid methyl ester, 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-methylthio-5-(o-chlorophenyl)-2,3-dihydro-2-thioxo-1H-1,4-benzodiazepine-1-acetic acid methyl ester.

In the manner given in prior Preparations 10 to 18, above, other 2,3-dihydro-2-oxo-1H-1,4-benzodiazepine-1-acetic acid alkyl esters can be obtained. Representative compounds thus obtained, include:

7-bromo-2,3-dihydro-5-phenyl-2-thioxo-1H-1,4-benzodiazepine-1-acetic methyl ester;

7-fluoro-2,3-dihydro-5-phenyl-2-thioxo-1H-1,4-benzodiazepine-1-acetic acid methyl ester;

2,3-dihydro-7-nitro-5-phenyl-2-thioxo-1H-1,4-benzodiazepine-1-acetic acid methyl ester;

5-(o-chlorophenyl)-2,3-dihydro-7-(methylthio)-2-thioxo-1H-1,4-benzodiazepine-1-acetic acid methyl ester;

7-bromo-5-(o-bromophenyl)-2,3-dihydro-2-thioxo-1,4-benzodiazepine-1-acetic acid methyl ester;

5-(o-fluorophenyl)-7-fluoro-2,3-dihydro-2-thioxo-1H-1,4-benzodiazepine-1-acetic acid methyl ester;

5-(o-chlorophenyl)-2,3-dihydro-7-propylthio-3-methyl-2-thioxo-1H-1,4-benzodiazepine-1-acetic acid methyl ester;

5-(o-chlorophenyl)-2,3-dihydro-2-thioxo-7-(trifluoromethyl)-1H-1,4-benzodiazepine-1-acetic acid methyl ester;

5-(o-chlorophenyl)-3-ethyl-2,3-dihydro-2-thioxo-1H-1,4-benzodiazepine-1-acetic acid methyl ester;

5-(o-chlorophenyl)-2,3-dihydro-7-(ethylthio)-2-thioxo-1H-1,4-benzodiazepine-1-acetic acid methyl ester;

7-chloro-5-(o-fluorophenyl)-2,3-dihydro-2-thioxo-1H-1,4-benzodiazepine-1-acetic acid methyl ester;

7-bromo-5-(o-fluorophenyl)-2,3-dihydro-2-thioxo-1H-1,4-benzodiazepine-1-acetic acid methyl ester;

7-fluoro-5-(o-fluorophenyl)-2,3-dihydro-2-thioxo-1H-1,4-benzodiazepine-1-acetic acid methyl ester;

5-(o-fluorophenyl)-2,3-dihydro-7-nitro-2-thioxo-1H-1,4-benzodiazepine-1-acetic acid methyl ester;

5-(o-fluorophenyl)-2,3-dihydro-2-thioxo-7-(trifluoromethyl)-1H-1,4-benzodiazepine-1-acetic acid methyl ester;

7-trifluoromethyl-5-(o-fluorophenyl)-2,3-dihydro-2-thioxo-1H-1,4-benzodiazepine-1-acetic acid methyl ester;

5-(o-fluorophenyl)-2,3-dihydro-7-(methylthio)-2-thioxo-1H-1,4-benzodiazepine-1-acetic acid methyl ester;

and the like.

PREPARATION 18

9-chloro-3,5-dihydro-7-phenyl-as-triazino-[4,3-a][1,4]benzodiazepin-2(1H)-one

A mixture of 0.5 g. (1.4 millimoles) of 7-chloro-2,3-dihydro-5-phenyl-2-thioxo-1H-1,4-benzodiazepine-1-acetic acid methyl ester, 70 mg. (1.4 millimoles) of hydrazine hydrate and 10 ml. of methanol is refluxed for about 3.75 hours. The mixture is allowed to cool, and the crystalline precipitate which separates is collected on a filter; yield, 0.280 g. of 9-chloro-3,5-dihydro-7-phenyl-as-triazino-[4,3-a][1,4]benzodiazepin-2-(1H)-one of melting point 267–270°C.

Anal. calcd. for $C_{17}H_{13}ClN_4O$: C, 62.87; H, 4.03; Cl, 10.92; N, 17.25.

Found: C, 62.60; H, 3.99; Cl, 10.69; N, 17.10.

PREPARATION 19

9-Chloro-7-(o-chlorophenyl)-3,5-dihydro-as-triazino[4,3-a][1,4]benzodiazepin-2-(1H)-one A mixture of 1.06 g. (2.7 millimoles) of 7-chloro-5-(o-chlorophenyl)-2,3-dihydro-2-thioxo-1H-1,4-benzodiazepine-1-acetic acid methyl ester, 0.14 g. (2.7 millimoles) of hydrazine hydrate and 20 ml. of methanol is refluxed for about 5 hours. The reaction mixture is then concentrated to about half of its original volume and allowed to crystallize to give on filtration 0.81 g. of 9-chloro-7-(o-chlorophenyl)-3,5-dihydro-as-triazino[4,3-a][1,4]benzodiazepin-2(1H)-one of melting point 232°–233°C.

Anal. calcd. for $C_{17}H_{12}Cl_2N_4O$: C, 56.84; H, 3.37; Cl, 19.74; N, 15.60.

Found: C, 56.35; H, 3.33; Cl, 19.92; N, 15.59.

PREPARATION 20

9-Chloro-7-(o-chlorophenyl)-3,5-dihydro-as-triazino[4,3-a][1,4]benzodiazepin-2(1H)-one A mixture of 0.8 g. (2.03 millimoles) of 7-chloro-5-(o-chlorophenyl)-2,3-dihydro-2-thioxo-1H-1,4-benzodiazepine-1-acetic acid methyl ester (V), 94 mg. (2.03 millimoles) of hydrate (VIII) and 20 ml. of methanol is heated under reflux for about 16 hours and then allowed to stand for 2 days. The mixture is evaporated and the residue is dissolved in 10 ml. of 50% ethyl acetate-cyclohexane and 3 ml. of methylene chloride and chromatographed on 90 g. of silica gel. Elution with 5% methanol-ethyl acetate gives 0.441 g. of 9-chloro-7-(o-chlorophenyl)-3,5-dihydro-as-triazino-[4,3-a][1,4]benzodiazepin-2-(1H)-one. Crystallization from ether afforded 0.255 g. of 9-chloro-7-(o-chlorophenyl)-3,5-dihydro-as-triazino[4,3-a][1,4]benzodiazepin-2(1H)-one.

PREPARATION 21

7-(o-chlorophenyl)-3,5-dihydro-as-triazino-[4,3-a][1,4]benzodiazepin-2(1H)-one

A mixture of 1.5 g. (4.34 millimoles) of 5-(o-chlorophenyl)-2,3-dihydro-2-thioxo-1H-1,4-benzodiazepine-1-acetic acid methyl ester, 0.217 g. (4.34 millimoles) of hydrazine hydrate and 20 ml. of methanol is heated under reflux for about 18.4 hours, concentrated to about half volume and allowed to stand. A yield of 1.004 g. of crystalline 7-(o-chlorophenyl)-3,5-dihydro-as-triazino[4,3-a][1,4]benzodiazepin-2(1H)-one of melting point 194°–196°C., is obtained. Recrystallization from methanol-methylene chloride raises the melting point 195°–196.5°C.

PREPARATION 22

7-(o-chlorophenyl)-3,5-dihydro-as-triazino-[4,3-a][1,4]benzodiazepin-2(1H)-one

A mixture of 1.55 g. (4.34 millimoles) of 5-(o-chlorophenyl)-2,3-dihydro-2-thioxo-1H-1,4-benzodiazepine-1-acetic acid methyl ester, 0.199 g. (4.34 millimoles) of hydrazine and 20 ml. of methanol is heated under reflux for about 18.5 hours. The reaction mixture is allowed to crystallize to give 0.303 g. of unreacted starting material which separates and is removed by filtration. The filtrate is evaporated and the residue thus obtained is dissolved in about 5 ml. of methylene chloride and chromatographed on 110 g. of silica gel. Elution with ethyl acetate gives 7-(o-chlorophenyl)-3,5-dihydro-as-triazino[4,3-a][1,4]benzodiazepin-2(1H)-one.

PREPARATION 23

9-chloro-3,5-dihydro-7-phenyl-as-triazino-[4,3-a][1,4]benzodiazepin-2(1H)-one

A mixture of 1.1 g. (3.08 millimoles) of 7-chloro-2,3-dihydro-5-phenyl-2-thioxo-1H-1,4-benzodiazepine-1-acetic acid methyl ester, 0.142 g. (3.08 millimoles) of hydrazine hydrate and 20 ml. of methanol is heated under reflux for about 20 hours. The reaction mixture is evaporated and the residue thus obtained is chromatographed on 240 g. of silica gel. Elution with ethyl acetate gives 0.523 g. of 9-chloro-3,5-dihydro-7-phenyl-as-triazino[4,3-a][1,4]benzodiazepin-2(1H)-one, which is recrystallized from ether to give 9-chloro-3,5-dihydro-7-phenyl-as-triazino[4,3-a][1,4]benzodiazepin-2(1H)-one.

PREPARATION 24

9-chloro-7-(2,6-difluorophenyl)-3,5-dihydro-as-triazino[4,3-a][1,4]benzodiazepin-2-(1H)-one A mixture of 3.0 millimoles of 7-chloro-2,3-dihydro-5-(2,6-difluorophenyl)-2-thioxo-1H-1,4-benzodiazepine-1-acetic acid methyl ester, 3.0 millimoles of hydrazine hydrate and 20 ml. of methanol is heated under reflux until the reaction is complete. The reaction mixture is then evaporated to dryness, and the residue thus obtained is chromatographed on silica gel and eluted thereform to give 9-chloro-7-(2,6-difluorophenyl)-3,5-dihydro-as-triazino[4,3-a][1,4]-benzodiazepin-2(1H)-one.

PREPARATION 25

3,5-dihydro-7-phenyl-9-trifluoromethyl-as-triazino[4,3-a][1,4]benzodiazepin-2(1H)-one A mixture of 3-millimoles of 2,3-dihydro-5-phenyl-2-thioxo-7-(trifluoromethyl)-1H-1,4-benzodiazepine-1-acetic acid ethyl ester, 3.0 millimoles of hydrazine hydrate and 20 ml. of methanol is heated under reflux until the reaction is complete. The reaction mixture is then evaporated to dryness, and the residue thus obtained is chromatographed on silica gel and eluted therefrom to give 3,5-dihydro-7-phenyl-9- trifluoromethyl-as-triazino[4,3-a][1,4]benzodiazepin-2(1H)-one.

PREPARATION 26

9-methylthio-3,5-dihydro-7-(o-chlorophenyl)-as-triazino[4,3-a][1,4]benzodiazepin-2(1H)-one A mixture of 3.0 millimoles of 7-methylthio-2,3-dihydro-5-(p-chlorophenyl)-2-thioxo-1H-1,4-benzodiazepine-1-acetic acid methyl ester, 3.0 millimoles of hydrazine hydrate and 20 ml. of methanol is heated under reflux until the reaction is complete. The reaction mixture is then evaporated to dryness, and the residue thus obtained is chromatographed on silica geel and eluted therefrom to give 9-methylthio-3,5-dihydro-7-(o-chlorophenyl)-as-triazino-[4,3-a][1,4]benzodiazepin-2(1H)-one.

PREPARATION 27

9-Fluoro-7-(o-fluorophenyl)-3,5-dihydro-as-triazino[4,3-a][1,4]benzodiazepine-1-acetic acid propyl ester, 3.0 millimoles of hydrazine hydrate, and 20 ml. of methanol is heated under reflux until the reaction is complete. The solvent is then removed from the reaction mixture by evaporation and the residue thus obtained is chromatographed on silica gel and eluted therefrom to give 9-fluoro-7-(o-fluorophenyl)-3,5-dihydro-as-triazino[4,3-a]-[1,4]benzodiazepin-2-(1H)-one.

PREPARATION 28

9-Bromo-3,5-dihydro-7-(o-nitrophenyl)-as-triazino[4,3-a][1,4]benzodiazepin-2(1H)-one A mixture of 3.0 millimoles of 7-bromo-2,3-dihydro-α-propyl-5-(o-nitrophenyl)-2-thioxo-1H-1,4-benzodiazepine-1-acetic acid methyl ester, 3.0 millimoles of hydrazine hydrate and 20 ml. of methanol is heated under reflux until the reaction is complete. The solvent is then removed from the reaction mixture by evaporation and the residue thus obtained is chromatographed on silica gel and eluted therefrom to give 9-bromo-3,5-dihydro-7-(o-nitrophenyl)-as-triazino[4,3-a][1,4]benzodiazepin-2(1H)-one.

PREPARATION 29

9-Methylthio-7-(o-chlorophenyl)-3,5-dihydro-5-methyl-as-triazino[4,3-a][1,4]benzodiazepin-2(1H)-one A mixture of 3.0 millimoles of 7-methylthio-5-(o-chlorophenyl)-2,3-dihydro-3-methyl-2-thioxo-1H-1,4-benzodiazepine-1-acetic acid methyl ester, 3.0 millimoles of hydrazine hydrate and 20 ml. of methanol is heated under reflux until the reaction is complete. The solvent is then removed from the reaction mixture by evaporation and the residue thus obtained is chromatographed on silica gel and eluted therefrom to give 9-methylthio-7-(o-chlorophenyl)-5-methyl-3,5-dihydro-as-triazino[4,3-a][1,4]benzodiazepin-2(1H)-one.

In the manner given in the preceding Preparations, other 2,3-dihydro-2-thioxo-1H-1,4-benzodiazepine-1-acetic acid alkyl esters can be condensed with the appropriate hydrazine hydrate to give other 3,5-dihydro-as-triazino[4,3-a][1,4]benzodiazepin-2(1H)-ones. Representative starting compounds thus obtained, include:

9-bromo-3,5-dihydro-7-phenyl-as-triazino[4,3-a][1,4]benzodiazepin-2(1H)-one;
9-fluoro-3,5-dihydro-7-phenyl-as-triazino[4,3-a][1,4]benzodiazepin-2(1H)-one;
3,5-dihydro-9-nitro-7-phenyl-as-triazino[4,3-a][1,4]benzodiazepin-2(1H)-one;
3,5-dihydro-7-phenyl-9-(trifluoromethyl)-as-triazino[4,3-a]-[1,4]benzodiazepin-2(1H)-one;
3,5-dihydro-9-(methylthio)-7-phenyl-as-triazino[4,3-a]-[1,4]benzodiazepin-2(1H)-one;
9-bromo-7-(o-bromophenyl)-3,5-dihydro-as-triazino[4,3-a]-[1,4]benzodiazepin-2(1H)-one;
7-(o-chlorophenyl)-9-fluoro-3,5-dihydro-as-triazino[4,3-a]-[1,4]benzodiazepin-2(1H)-one;
7-(o-chlorophenyl)-3,5-dihydro-9-propylthio-5-methyl-as-triazino[4,3-a][1,4]benzodiazepin-2(1H)-one;
7-(o-chlorophenyl)-3,5-dihydro-9-(trifluoromethyl)-as-triazino[4,3-a][1,4]benzodiazepin-2(1H)-one;
7-(o-chlorophenyl)-5-ethyl-3,5-dihydro-as-triazino[4,3-a][1,4]benzodiazepin-2(1H)-one;
7-(o-chlorophenyl)-3,5-dihydro-9-(ethylthio)-as-triazino[4,3-a][1,4]benzodiazepin-2(1H)-one;
9-chloro-7-(o-fluorophenyl)-3,5-dihydro-as-triazino[4,3-a][1,4]benzodiazepin-2(1H)-one;
9-bromo-7-(o-fluorophenyl)-3,5-dihydro-as-triazino[4,3-a][1,4]benzodiazepin-2(1H)-one;
9-fluoro-7-(o-fluorophenyl)-3,5-dihydro-as-triazino[4,3-a][1,4]benzodiazepin-2(1H)-one;
7-(o-fluorophenyl)-3,5-dihydro-9-nitro-as-triazino[4,3-a][1,4]benzodiazepin-2(1H)-one;
7-(o-fluorophenyl)-3,5-dihydro-9-(trifluoromethyl)-as-triazino[4,3-a][1,4]benzodiazepin-2(1H)-one;
7-(o-chlorophenyl)-9-isopropylthio-3,5-dihydro-as-triazino[4,3-a][1,4]benzodiazepin-2(1H)-one;
7-(o-fluorophenyl)-3,5-dihydro-9-(methylthio)-as-triazino-[4,3-a][1,4]benzodiazepin-2(1H)-one;
and the like.

EXAMPLE 1

9-Chloro-7-(o-chlorophenyl)-3-[2-(dimethylamino)ethyl]-3,5-dihydro-as-triazino[4,3-a][1,4]benzodiazepin-2(1H)-one Sodium hydride (0.42 g. of 57% dispersion in mineral oil;) 0.01 mole is added to a solution of 9-chloro-7-(o-chlorophenyl)-3,5-dihydro-as-triazino[4,3-a][1,4]benzodiazepin-2(1H)-one (3.59 g.; 0.01 mole) in 50 ml. of dimethylformamide and the mixture is heated on the steambath for 1 hour. A solution of dimethylaminoethyl chloride (1.07 g.; 0.01 mole) in 1.07 g. of xylene is then added, the mixture heated at 95°C. for 22 hours and evaporated. The residue is dissolved in methylene chloride-water, the organic layer is extracted with 10% aqueous hydrochloric acid, the acidic extract is cooled and basified with 20% aqueous sodium hydroxide solution. The product is extracted with methylene chloride, the solution is washed with saturated salt solution, dried, anhydrous magnesium sulfate, and evaporated. The residue (3.4 g.) is dissolved in 10 ml. of ethyl acetate and chromatographed on 340 g. of silica gel (the solvents contained 1% of triethylamine). Elution with ethyl acetate (fractions 1–10, 150 ml. each) gives no material. Elution with 5% methanol-ethyl acetate (fractions 11–20, 100 ml. each) gives 0.382 g. which in thin layer chromatography moves the same as starting material.

Elution with methanol (fractions 38–45, 100 ml. each) gives 1.98 g. of 9-chloro-7-(o-chlorophenyl)-3-[2-(dimethylamino)ethyl]-3,5-dihydro-astriazino[4,3a][1,4]benzodiazepin-2(1H)-one which was dissolved in ether, filtered from some amorphous material and allowed to crystallize giving 1.7 g. of filtrate of melting point 166°–167° C. unchanged on recrystallization from ether.

Anal. calcd. for $C_{21}H_{21}Cl_2N_5O$: C, 58.61; H, 4.92; Cl, 16.48; N, 16.27.
Found: C, 58.62; H, 5.11; Cl, 16.45; N, 16.08.

Example 2

9-Chloro-7-(o-chlorophenyl)-3-[3-(dimethylamino)-propyl]-3,5-dihydro-as-triazino[4,3-a][1,4]benzodiazepin-2(1H)-one Sodium hydride (0.42 g. of 57% dispersion in mineral oil) 0.01 mole was added to a solution of 9-chloro-7-(o-chlorophenyl)-3,5-dihydro-as-triazino[4,3-a][1,4]benzodiazepine-2(1H)-one (3.59 g.; 0.01 mole) in 50 ml. of dimethylformamide and the mixture was heated on the steambath for 1 hour. A solution of dimethylaminopropyl chloride (1.21 g.; 0.01 mole) in 1.21 g. of xylene was then added, the mixture was heated at 95° C. for 20 hours, and evaporated. The residue was dissolved in methylene chloride-water, the organic layer was washed with water, then saturated salt solution, dried over anhydrous magnesium sulfate, and evaporated. The residue (4 g.) was dissolved in 20 ml. of ethyl acetate and chromatographed on 400 g. of silica gel (100 ml. fractions were collected). Elution with ethylacetate (fractions 1–12) gave an oil. Elution with 5% methanol-95% ethyl acetate (fractions 13–23) gave some starting material (by thin layer chromatography). Elution with methanol (fractions 24–40) gave 2.7 g. of 9-chloro-7-(o-chlorophenyl)-3-[3-(dimethylamino)-propyl]-3,5-dihydro-as-triazino[4,3-a][1,4]benzodiazepin-2(1H)-one. Crystallization from ether (with activated charcoal) gave pure 9-chloro-7-(o-chlorophenyl)-3-[3-(dimethylamino)propyl]-3,5-dihydro-as-triazino[4,3-a][1,4]-benzodiazepin-2(1H)-one in two crops: 1.561 g. of melting point 146°–147° C. and 0.376 g. of melting point 144°–145° C.

Anal. calcd. for $C_{22}H_{23}Cl_2N_5O$: C, 59.46; H, 5.22; Cl, 15.96; N, 15.76.
Found: C, 59.50; H, 5.21; Cl, 15.97; N, 15.71.

EXAMPLE 3

9-Chloro-7-phenyl-3-[2-(dimethylamino)ethyl]-3,5-dihydro-as-triazino[4,3-a][1,4]benzodiazepin-2(1H)-one In the manner given in Example 1, sodium hydride is added to a solution of 9-chloro-7-phenyl-3,5-dihydro-as-triazino-[4,3-a][1,4]benzodiazepin-2(1H)-one in dimethylformamide and thereafter the mixture is heated with dimethylaminoethyl chloride to give 9-chloro-7-phenyl-3-[2-(dimethylamino)ethyl]-3,5-dihydro-as-triazino[4,3-a][1,4]benzodiazepin-2(1H)-one of melting point 157°–158° C.

EXAMPLE 4

9-Chloro-7-phenyl-3-[3-(dimethylamino)propyl]-3,5-dihydro-as-triazino[4,3-a][1,4]benzodiazepin-2(1H)-one In the manner given in Example 1, sodium hydride is added to a solution of 9-chloro-7-phenyl-3,5-dihydro-as-triazino[4,3-a][1,4]benzodiazepin-2(1H)-one in dimethylformamide and thereafter the mixture is heated with dimethylaminopropyl chloride to give 9-chloro-7-phenyl-3-[3-(dimethylamino)propyl]-3,5-dihydro-as-triazino[4,3-a][1,4]-benzodiazepin-2(1H)-one of melting point 124°–125° C.

EXAMPLE 5

7-(o-Chlorophenyl)-3-[2-(dimethylamino)ethyl]-3,5-dihydro-as-triazino[4,3-a][1,4]benzodiazepin-2(1H)-one In the manner given in Example 1 sodium hydride is added to a solution of 7-(o-chlorophenyl)-3,5-dihydro-as-triazino[4,3-a][1,4]benzodiazepin-2(1H)-one in dimethylformamide and thereafter the mixture is heated with 2-(dimethylamino)ethyl chloride to give 7-(o-chlorophenyl)-3-[2-(dimethylamino)ethyl]-3,5-dihydro-as-triazino[4,3-a]-[1,4]benzodiazepin-2(1H)-one of melting point 168°–169° C.

EXAMPLE 6

7-(o-chlorophenyl)-3-[3-(dimethylamino)propyl]-3,5-dihydro-as-triazino[4,3-a][1,4]benzodiazepin-2(1H)-one In the manner given in Example 1 sodium hydride is added to a solution of 7-(o-chlorophenyl)-3,5-dihydro-as-triazino[4,3-a][1,4]benzodiazepin-2(1H)-one in dimethylformamide and thereafter the mixture is heated with 3-(dimethylamino)propyl chloride to give 7-(o-chlorophenyl)-3-[3-(dimethylamino)propyl]-3,5-dihydro-as-triazino[4,3-a]-[1,4]benzodiazepin-2(1H)-one of melting point 148°–149° C.

EXAMPLE 7

9-Chloro-7-(o-chlorophenyl)-3-[2-(4-methylpiperazino)ethyl]-3,5-dihydro-as-triazino[4,3-a][1,4]benzodiazepin-2(1H)-one In the manner given in Example 1, sodium hydride is added to a solution of 9-chloro-7-(o-chlorophenyl)-3,5-dihydro-as-triazino[4,3-a][1,4]benzodiazepin-2(1H)-one in dimethylformamide and thereafter the mixture is heated with 2-(4-methylpiperazinyl)ethyl chloride to give 9-chloro-7-(o-chlorophenyl)-3-[2-(4-methylpiperazino)ethyl]-3,5-dihydro-as-triazino[4,3-a][1,4]benzodiazepin-2(1H)-one.

EXAMPLE 8

9-Chloro-7-(2,6-difluorophenyl)-3-[3-(morpholino)-propyl]-3,5-dihydro-as-triazino[4,3-a][1,4]benzodiazepin-2(1H)-one In the manner given in Example 1, sodium hydride is added to a solution of 9-chloro-7-(2,6-difluorophenyl)-3,5-dihydro-as-triazino[4,3-a][1,4]benzodiazepin-2(1H)-one in dimethylacetamide and thereafter the mixture is heated with 3-morpholinopropyl bromide to give 9-chloro-7-(2,6-difuorophenyl-3-[3-(morpholino)propyl]-3,5-dihydro-as-triazino[4,3-a][1,4]benzodiazepin-2(1H)-one.

EXAMPLE 9

9-Trifluoromethyl-7-phenyl-3-[2-(piperidino)-ethyl]-3,5-dihydro-as-triazino[4,3-a][1,4]benzodiazepin-2(1H)-one In the manner given in Example 1 sodium hydride is added to a solution of 9-trifluoromethyl-7-phenyl-3,5-di-hydro-as-triazino[4,3-a][1,4]benzodiazepin-2(1H)-one in dimethylformamide and thereafter the mixture is heated with 2-(piperidino)ethyl iodide to give 9-trifluoromethyl-7-phenyl-3-[2-

(piperidino)ethyl]-3,5-dihydro-as-triazino[4,3-a][1,4]benzodiazepin-2(1H)-one.

EXAMPLE 10

9-Methylthio-7-(o-chlorophenyl)-3-[3-(pyrrolidino)propyl]-3,5-dihydro-as-triazino[4,3-a][1,4]benzodiazepin-2(1H)-one In the manner given in Example 1 sodium hydride is added to a solution of 9-methylthio-7-(o-chlorophenyl)-3,5-dihydro-as-triazino[4,3-a][1,4]benzodiazepin-2(1H)-one in dimethylformamide and thereafter the mixture is heated with 3-(pyrrolidino)propyl bromide to give 9-methylthio-7-phenyl-3-[3-(pyrrolidino)propyl]-3,5-dihydro-as-triazino-[4,3a][1,4]benzodiazepin-2(1H)-one.

EXAMPLE 11

9-Fluoro-7-(o-fluorophenyl)-3-[2-(morpholino)-ethyl]-3,5-dihydro-as-triazino[4,3-a][1,4]benzodiazepin-2(1H)-one In the manner given in Example 1 sodium hydride is added to a solution of 9-fluoro-7-(o-fluorophenyl)-3,5-dihydro-as-triazino[4,3-a][1,4]benzodiazepin-2(1H)-one in dimethylformamide and thereafter the mixture is heated with 2-(morpholino)ethyl chloride to give 9-fluoro-7-(o-fluorophenyl)-3-[2-(morpholino)ethyl]-3,5-dihydro-as-triazino[4,3-a][1,4]benzodiazepin-2(1H)-one.

EXAMPLE 12

9-Bromo-7-(o-nitrophenyl)-3-[2-(diethylamino)ethyl]-3,5-dihydro-as-triazino[4,3-a][1,4]benzodiazepin-2(1H)-one

EXAMPLE 13

9-Methylthio-7-(o-chlorophenyl)-3-[2-(dipropylamino)ethyl]-5-methyl-3,5-dihydro-as-triazino[4,3-a][1,4]-benzodiazepin-2(1H)-one In the manner given in Example 1 sodium hydride is added to a solution of 9-methylthio-7-(o-chlorophenyl)-5-methyl-3,5-dihydro-as-triazino[4,3-a][1,4]benzodiazepin-2(1H)-one in dimethylformamide and thereafter the mixture is heated with 2-(dipropylamino)ethyl chloride to give 9-methylthio-7-(o-chlorophenyl)-3-[2-(dipropylamino)ethyl]-5-methyl-3,5-dihydro-as-triazino[4,3-a][1,4]benzodiazepin-2(1H)-one.

EXAMPLE 14

9-Bromo-7-(o-fluorophenyl)-3-[3-(pyrrolidino)-propyl]-3,5-dihydro-as-triazino[4,3-a][1,4]benzodiazepin-2(1H)-one In the manner given in Example 1, sodium hydride is added to a solution of 9-bromo-7-(o-fluorophenyl)-3,5-dihydro-as-triazolo[4,3-a][1,4]benzodiazepin-2(1H)-one in diethyl acetamide and thereafter the mixture is treated with 3-(pyrrolidino)propyl iodide to give 9-bromo-7-(o-fluorophenyl)-3-[3-(pyrrolidino)propyl]-3,5-dihydro-as-triazino-[4,3-a][1,4]benzodiazepin-2(1H).

EXAMPLE 15

9-Chloro-7-(o-chlorophenyl)-3-[2-(methylamino)-ethyl]-3,5-dihydro-as-triazino[4,3-a][1,4]benzodiazepin-2(1H)-one A mixture of 9-chloro-7-(o-chlorophenyl)-3-[2-(dimethylamino)ethyl]-3,5-dihydro-as-triazino[4,3-a][1,4]benzodiazepin-2(1H)-one (3.13 mmole), ethyl chloroformate (22.4 mmole) and 50 ml. of chloroform is refluxed for 12 hours. The resulting solution is evaporated. The residue dissolved in methylene chloride is washed with aqueous sodium bicarbonate, dried over anhydrous magnesium sulfate and evaporated to give the crude 9-chloro-7-(o-chlorophenyl)-3-[2-(carbethoxy-2'-methylamino)ethyl]-3,5-dihydro-as-triazino[4,3-a][1,4]benzodiazepin-2(1H)-one. A mixture of the carbethoxy compound (1 g.), potassium hydroxide (318 mg.) and 10 ml. of propylene glycol is heated at 95° C. for 1 hour and evaporated at 0.1 mm. at 50°–60° C. Water (5 ml.) is added and the product is extracted with methylene chloride and purified to give 9-chloro-7-(o-chlorophenyl)-3-[2-(methylamino)ethyl]-3,5-dihydro-as-triazino[4,3-a][1,4]benzodiazepin-2(1H)-one.

EXAMPLE 16

9-Chloro-7-(o-chlorophenyl)-3-[2-(amino)ethyl]-3,5-dihydro-as-triazino[4,3-a][1,4]benzodiazepin-2(1H)-one In the manner given in Example 1 sodium hydride is added to a solution of 9-chloro-7-(o-chlorophenyl)-3,5-dihydro-as-triazino[4,3-a][1,4]benzodiazepin-2(1H)-one in dimethylformamide, and then treated with 1 N-(2-bromoethyl)phthalimide to give 9-chloro-7-(o-chlorophenyl)-3-[2-phthalimido ethyl]-3,5-dihydro-as-triazino[4,3-a]-[1,4]benzodiazepin-2(1H)-one.

A mixture of the phthalimidoethyl product (4.47 mmole) hydrazine hydrate (17.9 mmole) and 25 ml. of ethanol is stirred at room temperature for 24 hours. The resulting suspension is filtered, and the filtrate evaporated. The residue is dissolved in methylene chloride and water, the organic layer is washed with water, dried over anhydrous magnesium sulfate and evaporated to give 9-chloro-7-(o-chlorophenyl)-3-[2-(amino)ethyl]-3,5-dihydro-as-triazino[4,3-a][1,4]benzodiazepin-2(1H)-one.

In the manner given in the previous examples, other compounds of formula II can be prepared such as:

9-bromo-7-phenyl-3-[2-(diethylamino)ethyl]-3,5-dihydro-as-triazino[4,3-a][1,4]benzodiazepin-2(1H)-one;

9-bromo-7-phenyl-3-[2-(morpholino)ethyl]-3,5-dihydro-as-triazino[4,3-a][1,4]benzodiazepin-2(1H)-one;

9-fluoro-7-phenyl-3-[2-(dipropylamino)propyl]-3,5-dihydro-as-triazino[4,3-a][1,4]benzodiazepin-2(1H)-one;

9-nitro-7-phenyl-3-[3-(pyrrolidino)propyl]-3,5-dihydro-as-triazino[4,3-a][1,4]benzodiazepin-2(1H)-one;

9-trifluoromethyl-7-phenyl-3-[2-(piperidino)ethyl]-3,5-dihydro-as-triazino[4,3--a][1,4]benzodiazepin-2(1H)-one;

9-methylthio-7-phenyl-3-[2-(N-methylpiperazino)ethyl]-3,5-dihydro-as-triazino[4,3-a][1,4]benzodiazepin-2(1H)-one;

9-bromo-7-(o-bromophenyl)-3-[3-(dipropylamino)propyl]-3,5-dihydro-as-triazino[4,3-a][1,4]benzodiazepin-2(1H)-one;

9-fluoro-7-(o-chlorophenyl)-3-[3-(piperidino)propyl]-3,5-dihydro-as-triazino[4,3-a][1,4]benzodiazepin-2(1H)-one;

9-propylthio-5-methyl-7-(o-chlorophenyl)-5-[3-(morpholino)-propyl]-3,5-dihydro-as-triazino[4,3-a][1,4]benzodiazepin-2(1H)-one;

9-trifluoromethyl-7-(o-chlorophenyl)-3-[2-(diethylamino)ethyl]-3,5-dihydro-as-triazino[4,3-a][1,4]benzodiazepin-2(1H)-one;

7-(o-chlorophenyl)-5-ethyl-3-[3-(dimethylamino)propyl]-3,5-dihydro-as-triazino[4,3-a][1,4]benzodiazepin-2(1H)-one;

9-ethylthio-7-(o-chlorophenyl)-3-[2-(pyrrolidino)ethyl]-3,5-dihydro-as-triazino[4,3-a][1,4]benzodiazepin-2(1H)-one;

9-chloro-7-(o-fluorophenyl)-3-(2-aminoethyl)-3,5-dihydro-as-triazino[4,3-a][1,4]benzodiazepin-2(1H)-one;

9-bromo-7-(o-fluorophenyl)-3-[2-(ethylamino)ethyl]-3,5-dihydro-as-triazino[4,3-a][1,4]benzodiazepin-2(1H)-one;

9-fluoro-7-(o-fluorophenyl)-3-[2-(dipropylamino)ethyl]-3,5-dihydro-as-triazino[4,3-a][1,4]benzodiazepin-2(1H)-one;

9-nitro-7-(o-fluorophenyl)-3-[2-(diethylamino)ethyl]-3,5-dihydro-as-triazino[4,3-a][1,4]benzodiazepin-2(1H)-one;

9-(trifluoromethyl)-7-(o-fluorophenyl)-3-[2-(piperidino)-ethyl]-3,5-dihydro-as-triazino[4,3-a][1,4]benzodiazepin-2(1H)-one;

9-isopropylthio-7-(o-chlorophenyl)-3-[3-(piperidino)propyl]-3,5-dihydro-as-triazolo[4,3-a][1,4]benzodiazepin-2(1H)-one;

9-methylthio-7-(o-fluorophenyl)-3-[3-(morpholino)propyl]-3,5-dihydro-as-triazino[4,3-a][1,4]benzodiazepin-2(1H)-one; and the like.

The pharmacologically acceptable acid addition salts of compounds of formula II (as well as of formula IIA and IIB) can be prepared and isolated by conventional processes, such as reacting a compound of formula II with a selected pharmacologically acceptable acid. Such acids include hydrochloric, hybrobromic, phosphoric, sulfuric, acetic, tartaric, lactic, citric, malic, maleic, methanesulfonic, benzenesulfonic, cyclohexanesulfamic acids, toluenesulfonic, and the like. The reaction is conveniently performed in an organic solvent, e.g., ether, dioxane or tetrahydrofuran, ethanol, methanol, ethyl acetate; the salts can be recovered by crystallization, precipitation or evaporating the solvent. These salts are useful in the same manner as the free base.

I claim:

1. A compound of the formula

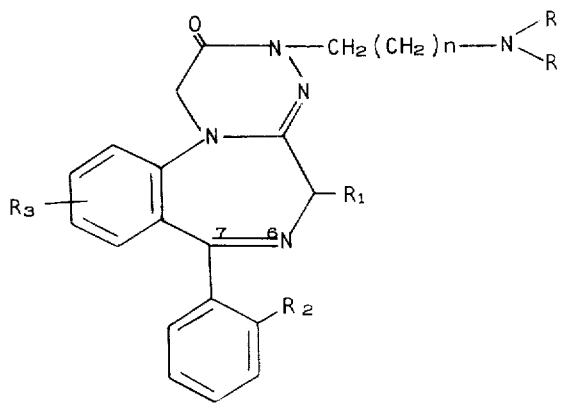

wherein n is 1 or 2; wherein R is hydrogen, alkyl of one to three carbon atoms, inclusive, or together

is pyrrolidino, piperidino, N-methylpiperazino, or morpholino; wherein $R_1$ is hydrogen or alkyl as defined above; and wherein $R_2$ and $R_3$ are hydrogen, alkyl as defined above, fluorine, chlorine, bromine, nitro, trifluoromethyl, or alkylthio in which alkyl is defined as above, and the pharmacologically acceptable acid addition salts thereof.

2. A compound according to claim 1 of the formula IIA

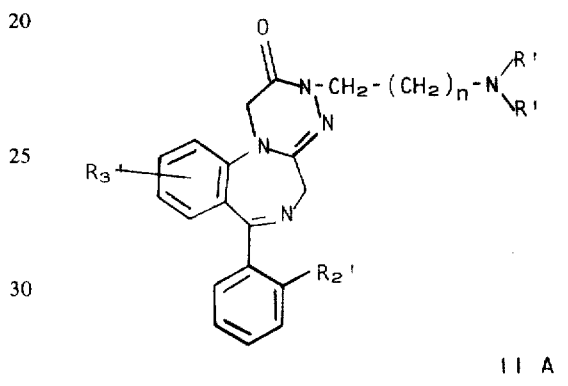

wherein n is 1 or 2; wherein R' is hydrogen or alkyl of one to three carbon atoms, inclusive, and wherein $R_2'$ and $R_3'$ are hydrogen, chlorine, or fluorine, and the pharmacologically acceptable acid addition salts thereof.

3. A compound according to claim 1 of the formula IIB

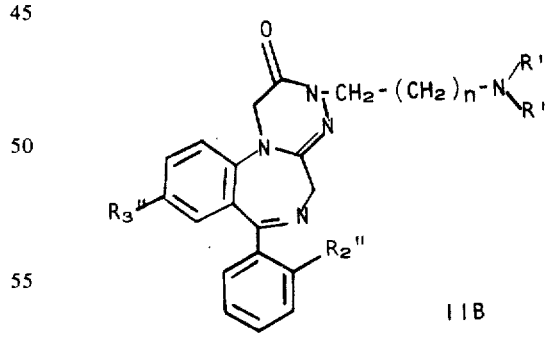

wherein n is 1 or 2; wherein R' is hydrogen or alkyl of one to three carbon atoms, inclusive, and wherein $R_2''$ and $R_3''$ are hydrogen or chlorine, and the pharmacologically acceptable acid addition salts thereof.

4. A compound according to claim 3, wherein R' is methyl, n is 1, $R_3''$ is chloro, $R_2''$ is hydrogen and the compound is therefore 9-chloro-7-phenyl-3-[2-

(dimethylamino)ethyl]-3,4-dihydro-as-triazino[4,3-a][1,4]benzodiazepin-2(1H)-one.

5. A compound according to claim 3 wherein R' is methyl, n is 2, $R_3''$ is chlorine, $R_2''$ is hydrogen and the compound is therefore 9-chloro-7-phenyl-3-[3-(dimethylamino)propyl]-3,5-dihydro-as-triazino[4,3-a][1,4]benzodiazepin-2(1H)-one.

6. A compound according to claim 3, wherein R' is methyl, n is 1, $R_3''$ is hydrogen, $R_2''$ is chlorine, and the compound is therefore 7-(o-chlorophenyl)-3-[2-(dimethylamino)ethyl]-3,5-dihydro-as-triazino[4,3-a][1,4]benzodiazepin-2(1H)-one.

7. A compound according to claim 3, wherein R' is methyl, n is 2, $R_3''$ is hydrogen, $R_2''$ is chlorine and the compound is therefore 7-(o-chlorophenyl)-3-[3-(dimethylamino)propyl]-3,5-dihydro-as-triazino[4,3-a][1,4]benzodiazepin-2(1H)-one.

8. A compound according to claim 3, wherein R' is methyl, n is 1, $R_2''$ and $R_3''$ are chlorine and the compound is therefore 9-chloro-7-(o-chlorophenyl)-3-[2-(dimethylamino)ethyl]-3,5-dihydro-as-triazino[4,3-a][1,4]benzodiazepin-2(1H)-one.

9. A compound according to claim 3, wherein R' is methyl, n is 2, $R_2''$ and $R_3''$ are chloro and the compound is therefore 9-chloro-7-(o-chlorophenyl)-3-[3-(dimethylamino)propyl]-3,5-dihydro-as-triazino[4,3-a][1,4]benzodiazepin-2(1H)-one.

* * * * *